US011192495B2

(12) United States Patent
Elli et al.

(10) Patent No.: US 11,192,495 B2
(45) Date of Patent: Dec. 7, 2021

(54) SELF-ADAPTIVE MULTIRESOLUTION DIGITAL-PLATE FOR MULTIMODAL ENHANCED SAFETY OF VEHICLES

(71) Applicant: Intel Corporation, Santa Clara, CA (US)

(72) Inventors: Maria Soledad Elli, Hillsboro, OR (US); Ignacio J. Alvarez, Portland, OR (US); Javier Felip Leon, Hillsboro, OR (US); David I. Gonzalez Aguirre, Hillsboro, OR (US); Javier Turek, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 68 days.

(21) Appl. No.: 16/726,433

(22) Filed: Dec. 24, 2019

(65) Prior Publication Data
US 2020/0130570 A1 Apr. 30, 2020

(51) Int. Cl.
*B60Q 1/50* (2006.01)
*H04L 12/40* (2006.01)
*G05D 1/00* (2006.01)
*B60R 13/10* (2006.01)

(52) U.S. Cl.
CPC .............. *B60Q 1/503* (2013.01); *H04L 12/40* (2013.01); *B60R 13/105* (2013.01); *G05D 1/0088* (2013.01); *H04L 2012/40215* (2013.01); *H04L 2012/40273* (2013.01)

(58) Field of Classification Search
None
See application file for complete search history.

(56) References Cited

U.S. PATENT DOCUMENTS

| 6,154,493 A * | 11/2000 | Acharya | H04N 1/648 375/240.19 |
| 2011/0311042 A1* | 12/2011 | Cheddad | G06F 21/64 380/28 |

OTHER PUBLICATIONS

SAE On-Road Automated Vehicle Standards Committee. "Taxonomy and definitions for terms related to on-road motor vehicle automated driving systems." SAE Standard J 3016 (2014): 1-16.
Shalev-Shwartz, Shai, Shaked Shammah, and Amnon Shashua. "On a formal model of safe and scalable self-driving cars." arXiv preprint arXiv:1708.06374 (2017). Version 6. https://arxiv.org/abs/1708.06374.
Gassmann, Bernd, et al. "Towards Standardization of AV Safety: C++ Library for Responsibility Sensitive Safety." 2019 IEEE Intelligent Vehicles Symposium (IV). IEEE, 2019.
(Continued)

*Primary Examiner* — Carlos Garcia
(74) *Attorney, Agent, or Firm* — Schiff Hardin LLP

(57) ABSTRACT

Techniques are disclosed to realize a self-adaptive multi-resolution digital plate (SAMDP) system that facilitates sharing of vehicle state information via a dynamically generated binary two-dimensional multispectral pattern. The binary 2D multispectral pattern adjusts its resolution to adapt to the visual perception process while communicating vehicle state information without relying on wireless communications (i.e. V2V, V2X, etc.). The techniques as described herein leverage the use of a multichannel spectral means that helps lower the error present in sensing and representation models used by automated driving systems.

13 Claims, 9 Drawing Sheets

(56) References Cited

OTHER PUBLICATIONS

T. Meuser et al., Dynamic Vehicle Path-Planning in the Presence of Traffic Events. The 44th IEEE Conference on Local Computer Networks (LCN 2019), Oct. 14-17, 2019, Osnabrück, Germany.

SAE-J2735, "Dedicated Short Range Communications (DSRC) Message Set Dictionary" Jan. 2016.

Fernández, María Rodríguez, Eduardo Zalama Casanova, and Ignacio González Alonso. "Review of display technologies focusing on power consumption." Sustainability 7.8 (2015): 10854-10875.

Danzer, Andreas, et al. "2D Car Detection in Radar Data with PointNets." arXiv preprint arXiv:1904.08414 (2019).

Stein, Gideon P., Ofer Mano, and Amnon Shashua. "A robust method for computing vehicle ego-motion." Proceedings of the IEEE Intelligent Vehicles Symposium 2000 (Cat. No. 00TH8511). IEEE, 2000.

\* cited by examiner

FIG. 6

Short distance. Worst Conditions. 58 bits

| seq | μ | α | ν | CRC |
|---|---|---|---|---|
| 5 bits | 32 bits | 10 bits | 8 bits | 3 bit |

Short distance. Good Conditions. 106 bits

| seq | μ | α | ν | CRC |
|---|---|---|---|---|
| 5 bits | 32 bits | 32 bits | 20 bits | 17 bit |

Short distance. Bad Conditions. 74 bits

| seq | μ | α | ν | CRC |
|---|---|---|---|---|
| 5 bits | 32 bits | 16 bits | 12 bits | 9 bit |

Short distance. Best Conditions. 134 bits

| seq | μ | α | ν | CRC |
|---|---|---|---|---|
| 5 bits | 32 bits | 32 bits | 32 bits | 33 bit |

SELF-ADAPTIVE MULTIRESOLUTION DIGITAL-PLATE FOR MULTIMODAL ENHANCED SAFETY OF VEHICLES

TECHNICAL FIELD

Aspects described herein generally relate to digital plate displays for vehicles and, more particularly, to techniques for encoding and displaying data with digital plate displays that may be used by self-driving systems.

BACKGROUND

As the technology for self-driving systems advances, so do the safety concerns. Many real-life examples ranging from L1 (driving assistance systems) to L5 (highly automated systems) of deployed and testing systems have demonstrated that driving safety cannot rely solely on probabilistic estimations nor on attentive drivers. This is why formal driving safety models aim to close the safety gap that exists today within self-driving systems. Such systems, however, rely heavily on machine learning (ML) models, which might fail to cover every type of driving situation.

BRIEF DESCRIPTION OF THE DRAWINGS/FIGURES

The accompanying drawings, which are incorporated herein and form a part of the specification, illustrate the aspects of the present disclosure and, together with the description, and further serve to explain the principles of the aspects and to enable a person skilled in the pertinent art to make and use the aspects.

FIG. 6 illustrates exemplary short distance message frames to be encoded into a 2D binary pattern for different environmental conditions, in accordance with an aspect of the disclosure.

The exemplary aspects of the present disclosure will be described with reference to the accompanying drawings. The drawing in which an element first appears is typically indicated by the leftmost digit(s) in the corresponding reference number.

DETAILED DESCRIPTION

Figure 1:
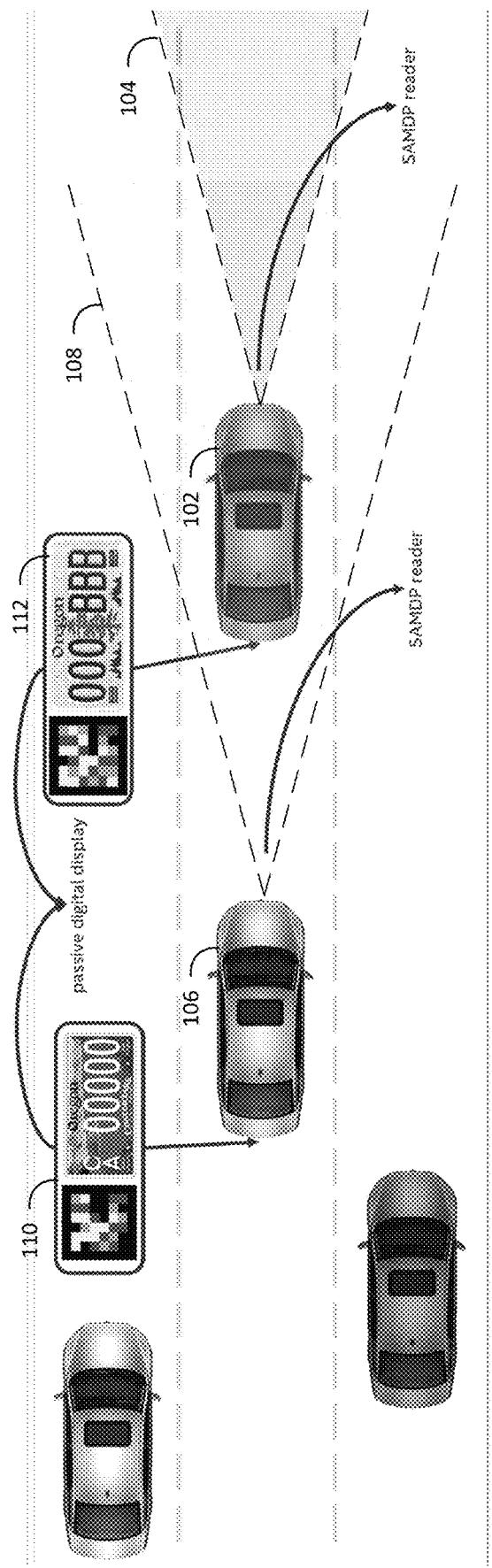
FIG. 1 illustrates a block diagram of an exemplary environment in which a Self-Adaptive Multiresolution Digital Plate (SAMDP) system is adapted for use with motorized vehicles, in accordance with an aspect of the disclosure.

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Again, current techniques to address safety concerns for self-driving systems have been inadequate. Some of the previous work in this field includes the use of path planning to communicate via vehicle to infrastructure communication (V2I) or the communication of vehicle state information using vehicle to vehicle (V2V) communication with regards to basic safety messages (BSM) (developed by SAE) using dedicated short-range communication (DSRC). However, none of these previous solutions propose a data exchange in a way that can also be implemented by vehicles that have no built-in automation or assisted driving features (i.e. Adaptive Cruise Control, Forward Collision Warning, etc.) or wireless communications capabilities.

Moreover, it is also noted that velocity estimation in advanced driver-assistance systems (ADAS) and autonomous vehicle (AV) systems is usually provided by lidars, radars, or a fusion between radar(s) and RGB camera(s). However, such systems suffer from errors and uncertainty introduced by noisy sensors, poor sensor calibration, or inaccurate sensor fusion, detection, and tracking algorithms. The danger of false positives (detecting a ghost vehicle that is not actually there) in systems such as Automatic Emergency Braking (AEB) is very high considering that applying full brakes because of a car that doesn't exist can cause serious rear end collisions.

Therefore, to address these issues, the aspects described herein are directed to a self-adaptive multiresolution digital plate (SAMDP) system that may facilitate sharing of vehicle state information via a dynamically generated binary bi-dimensional multispectral pattern. The pattern adjusts its resolution to adapt the visual perception process while communicating vehicle state information without relying on wireless communications (i.e. V2V, V2X, etc.). The aspects as described herein leverage the use of a multichannel spectral means that helps lower the error present in sensing and representation models used by automated driving systems.

Further, the data communicated from an ego-vehicle to other vehicles or infrastructure systems on the road is synthesized via the dynamically generated binary bi-dimensional multispectral pattern, which is also referred to herein as a matrix code or simply as a 2D pattern. This matrix code is then displayed by a digital plate screen with a high contrast and sharp edges to mitigate blurring effects during the image formation process, and is described by the point-spread function (PSF). The aspects as described herein provide further advantages over existing visual communication systems, which require constant energy to transmit information, as the aspects as described herein may also exploit recent advances in passive digital displays such as those used in digital paper.

As further discussed herein, the SAMDP system facilitates the communication of safety related information to vehicles that have the capability to detect such messages and exploit this information into their safety pipeline. Using this extra information, other vehicles may increase their observability of the world and decrease errors present in their driving behavior algorithms with minimal effort. As an added advantage, the communication techniques as described herein may be implemented as unidirectional communications, meaning that the sender is not waiting for acknowledgement of others (as may be the case when wirelessly broadcasting messages). This SAMDP system can thus be utilized by any vehicle with a Controller Area Network (CAN) bus system (which is essentially every car on the road built after 2003 after the on-board diagnostics (OBD-II) standard was enforced in the United States and Europe), regardless of whether it is a highly automated system or a human-driven vehicle with no assisted driving features.

The aspects described herein thus provide significant advantages for the end user, such as drivers on the road, by increasing a user's own vehicle safety as a result of significantly reducing the probability of having a rear collision due to the failure of an abnormal sensing situation in autonomous vehicles. Additional advantages include improving energy consumption, reducing vehicle deterioration, and increasing traveling comfort for other vehicles (and consequently/eventually the user's own vehicle) due to other vehicles being able to establish an accurate safety distance with adaptive and reliable confidence. Thus, accelerations and deacceleration can be better planned to avoid "jerky" motions that consume unnecessary energy for a trip. Further still, the aspects as described herein function to reduce response latency with respect to "platooning" arrangements by improving wind-tunnel effects and reducing accidents during attachment and detachment of platooning maneuverings.

Self-Adaptive Multiresolution Digital Plate (SAMDP) System

FIG. 1 illustrates a block diagram of an exemplary environment in which a Self-Adaptive Multiresolution Digital Plate (SAMDP) system is adapted for use with motorized vehicles, in accordance with an aspect of the disclosure. FIG. 1 shows an example environment in which the SAMDP system as discussed herein may be implemented for ease of explanation. However, the SAMDP system aspects as described herein are not limited to this particular example of vehicles and/or the particular environment of a road for such vehicles. For instance, the SAMDP system aspects as described herein may be implemented by any suitable type of "agent," which may include any suitable type of object that may benefit from sharing information encoded in the 2D binary patterns with other nearby agents.

For example, the term "agents" may encompass both movable objects and stationary objects that may interact with other movable objects and/or other stationary objects within a particular environment. This may include, for instance, fully autonomous vehicles or semi-autonomous vehicles ranging from L1 (driving assistance systems) to L5 (highly automated systems). Moreover, agents may include vehicles that do not have built-in automation or assisted driving features (e.g. adaptive cruise control, forward collision warning, etc.) or wireless communications capabilities. To provide other examples, the agents may additionally or alternatively be implemented as objects other than vehicles on a roadway, such as forklifts, automated equipment, conveyor-based systems, street signs, billboards, etc.

With reference to FIG. 1, the example SAMDP system environment 100 includes several vehicles driving on a road. The vehicles 102, 106 are shown in FIG. 1 as implementing the SAMDP system as further discussed herein, although each vehicle within the environment 100 may similarly implement a SAMDP system including the plate and readers as shown in FIG. 1, with details being provided only for the vehicles 102, 106 for clarity and ease of explanation.

Continuing this example, the vehicle 102 includes the SAMDP 112, and the vehicle 106 includes the SAMDP 110 as shown. In various aspects, the entirety of the SAMDP 110, 112 may be a digital display, or only the portion of the state license plate information may be associated with the SAMDP. In other words, the state license plates as shown may be standard, physical plates, and the 2D binary patterns as shown may be presented on separate SAMDP device displays. Alternatively, the SAMDPs 110, 112 may include both the state license plate information and the 2D binary code or pattern as shown in FIG. 1. In any event, aspects include the display portion of the SAMDPs 110, 112 that displays the actual 2D binary patterns as being implemented as any suitable type of display, as further discussed herein. For instance, the SAMDPs 110, 112 may implement passive digital displays such as those used in digital paper, active or passive matrix displays, etc.

With continued reference to FIG. 1, each of the vehicles 102, 106 may be an autonomous vehicle (although they need not be) having a respective SAMDP 112, 110 mounted at the rear of each vehicle, although aspects include the SAMDPs 110, 112 being additionally or alternatively mounted on the front of each vehicle. The vehicles 102, 106 also include a SAMDP reader mounted on the front of each vehicle 102, 106, which is not shown in detail in FIG. 1 for clarity but is further discussed in detail below. Thus, the SAMDP reader associated with the vehicle 106 provides a reading range 108, whereas the SAMDP reader associated with the vehicle 102 provides a reading range 104. These SAMDP readers may be implemented as one or more suitable cameras that may recognize 2D binary patters and are suitable for operation outside or inside of each respective vehicle 102, 106.

Continuing the present example, the vehicle 102 may collect information associated with its current environment and/or its current operating state using one or more sensors that may be located internally or external to the vehicle 102, information derived from communication with systems within the vehicle 102 (e.g. via controller area network (CAN) bus communications), sensors incorporated as part of the SAMDP system (e.g., within the display, mounted to or otherwise part of the digital plate), etc. This information may then be used to calculate data units that are encoded into a message as a 2D binary pattern, which may alternatively be referred to herein as a 2D binary code or simply as a 2D pattern, and then displayed via the SAMDP 112. The data units included in the message, which are represented in the displayed 2D binary pattern, may include information associated with the vehicle 102 such as, for example, parameters such as an estimated friction coefficient $\mu$, a combined braking efficiency and friction uncertainty factor $\alpha$, a velocity $v$ of the vehicle 102, etc. The vehicle 106 may then decode this message using its SAMDP reader to obtain the encoded information, which may be used to increase the accuracy of calculations that may be particularly useful for autonomous driving systems. Additional details regarding how the 2D binary codes are generated by vehicles and how the SAMDP codes are read and utilized by other vehicles are further discussed below.

With respect to the use of information encoded into the 2D patterns by autonomous vehicles, this may include any suitable type of data units that may be read, decoded, and implemented by another agent such as another vehicle. These other agents may include, for instance, both standard vehicles without autonomous or driving assistance systems as well as vehicles implementing ADAS, fully autonomous vehicles, or semi-autonomous vehicles ranging from L1 (driving assistance systems) to L5 (highly automated systems). For example, in various aspects, the data units may correspond to particular types of parameters that are used in accordance with a particular safety model, as further discussed herein. However, the data units may alternatively or additionally include or other types of data that do not directly correlate with the parameters implemented in such safety models (e.g. the type of vehicle, model information, information related to the capabilities or the vehicle with respect to autonomous capabilities, etc.).

In any event, the encoded data units may be read, decoded, and used by an agent implementing the appropriate 2D pattern reader system to do, as discussed in further detail herein. Again, aspects include these data units corresponding to a particular type of autonomous driving behavioral safety model (also referred to herein as a "safety driving model"). For clarity and ease of explanation, the examples described illustrate that the encoded data units represent various safety driving model parameters. However, the aspects as described herein are not limited to the use of these specific parameters as the encoded data units, nor are the aspects described herein limited to only encoding data units in accordance with the safety driving model parameters. Again, the aspects as described herein may encode data units that represent any relevant information for other agents, and may include parameters or other suitable data based upon any suitable autonomous driving behavioral safety model or other mathematical model, function, or usage.

A safety driving model may be an open and transparent mathematical model that functions as a set of objectives to be followed to ensure autonomous vehicle safety, which has been developed to address safety considerations for autonomous vehicles. The safety driving mathematical models represent guidelines to be followed that mimic basic principles humans follow when driving, such as defining dangerous situations, the cause of dangerous situations, and how to respond to them. Thus, the safety driving mathematical models define specific parameters and techniques with respect to safety considerations to be universally followed for autonomous vehicles in an attempt to standardize their behavior.

For example, a safety driving mathematical model may include a definition of acceptable safe or minimum distances that, when met, allow the vehicle 106 to safely merge into flowing traffic. As another example with respect to the vehicle 106, the safety driving mathematical model may define a safe distance for the vehicle 106 to maintain behind the vehicle 102. With respect to the following distance, or the spacing between vehicles, the safety driving mathematical model calculation may be referred to as a longitudinal minimum distance, which is further discussed below with reference to FIG. 2.

Figure 2:
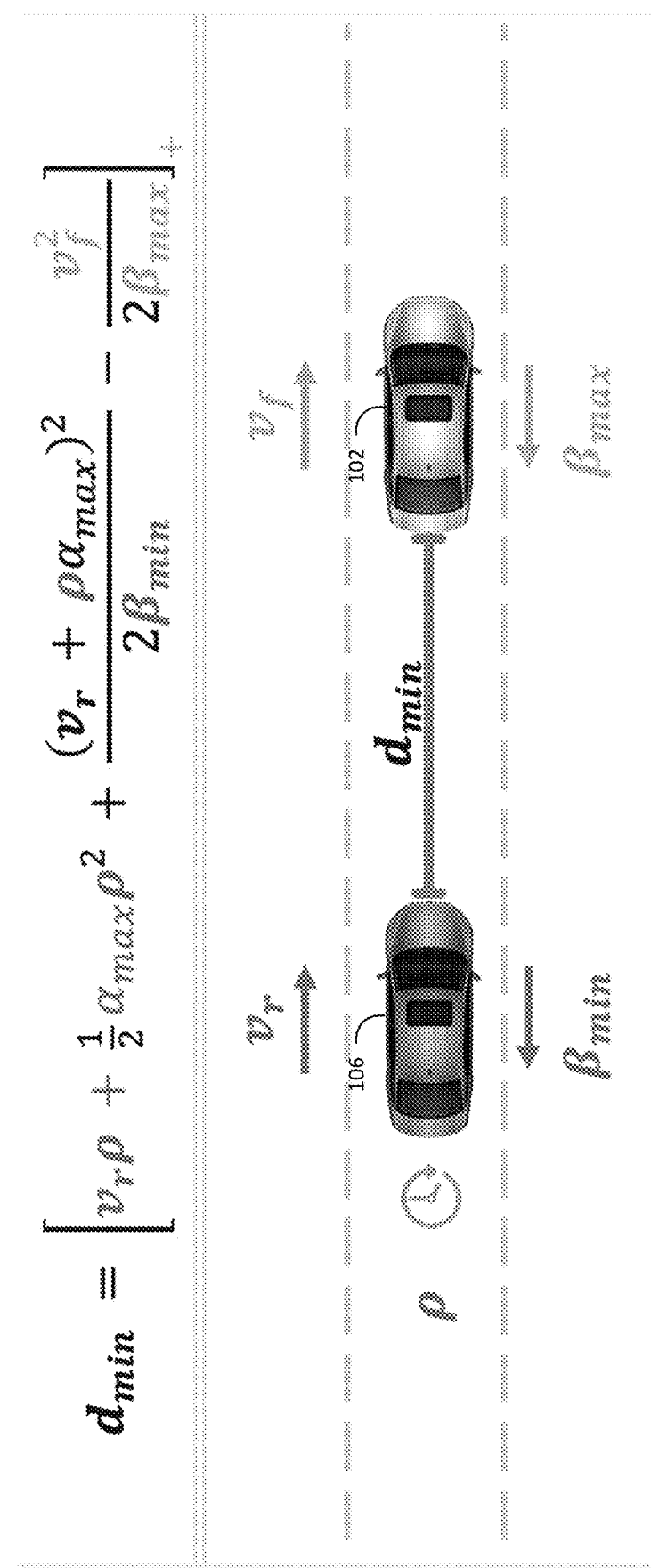
FIG. 2 illustrates a map showing an example calculation of a longitudinal minimum distance between vehicles using a safety driving model, in accordance with an aspect of the disclosure.

FIG. 2 illustrates a map showing an example calculation of the longitudinal minimum distance between vehicles, in accordance with an aspect of the disclosure. With continued reference to FIG. 2, the minimum safe following distance $d_{min}$, or the longitudinal minimum distance, may be defined in Equation 1 below as follows:

$$d_{min} = \left[ v_r\rho + \frac{1}{2}\alpha_{max}\rho^2 + \frac{(v_r + \rho\alpha_{max})^2}{2\beta_{min}} - \frac{v_f^2}{2\beta_{max}} \right], \quad \text{Eqn. 1}$$

Where the safety driving model parameters include $v_r$ which represents the velocity of the rear car 106, $v_f$ which represents the velocity of the front car 102, $\rho$ which represents the response time, $\alpha_{max}$ which represents the maximum acceleration of the rear car 106, $\beta_{min}$ which represents the minimum braking of the rear car 106, and $\beta_{max}$ which represents the maximum braking of the front car 102.

In other words, the longitudinal minimum distance is a function of parameters associated with both the vehicle 102 and the vehicle 106 indicative of each vehicle's operational state. As a result, accurately calculating the values of these safety driving model parameters while an autonomous vehicle (such as the vehicle 106, for example) is driving presents challenges, as information related to the vehicle 102 may not be readily communicated to the vehicle 106. For instance, the allowed maximum braking force $\beta_{max}$ is typically enforced by regulators to maintain a balance between safety and road network utilization. While this approach helps the automated driving technology to be more useful and will allow automated vehicles to share the roads with humans smoothly, the safety benefits of this technology may be expanded adding an extra source of accurate information to be used by other automated vehicles.

Thus, the aspects described herein enable a vehicle to dynamically encode and share its state information (e.g. velocity, braking force, etc.) with other vehicles using a displayed 2D pattern. Moreover, the aspects as discussed herein also enable vehicles to recognize other vehicle's state information by reading and decoding this information encoded into the displayed 2D patterns using that vehicle's SAMDP system. Thus, and as further discussed below, the aspects described herein are directed to two primary concepts, which include the use of a multiresolution multispectral 2D binary pattern for efficient information transmission on a digital plate and a messaging protocol that assigns dynamic data resolution based on environmental conditions and predetermined distance thresholds.

Figure 3:
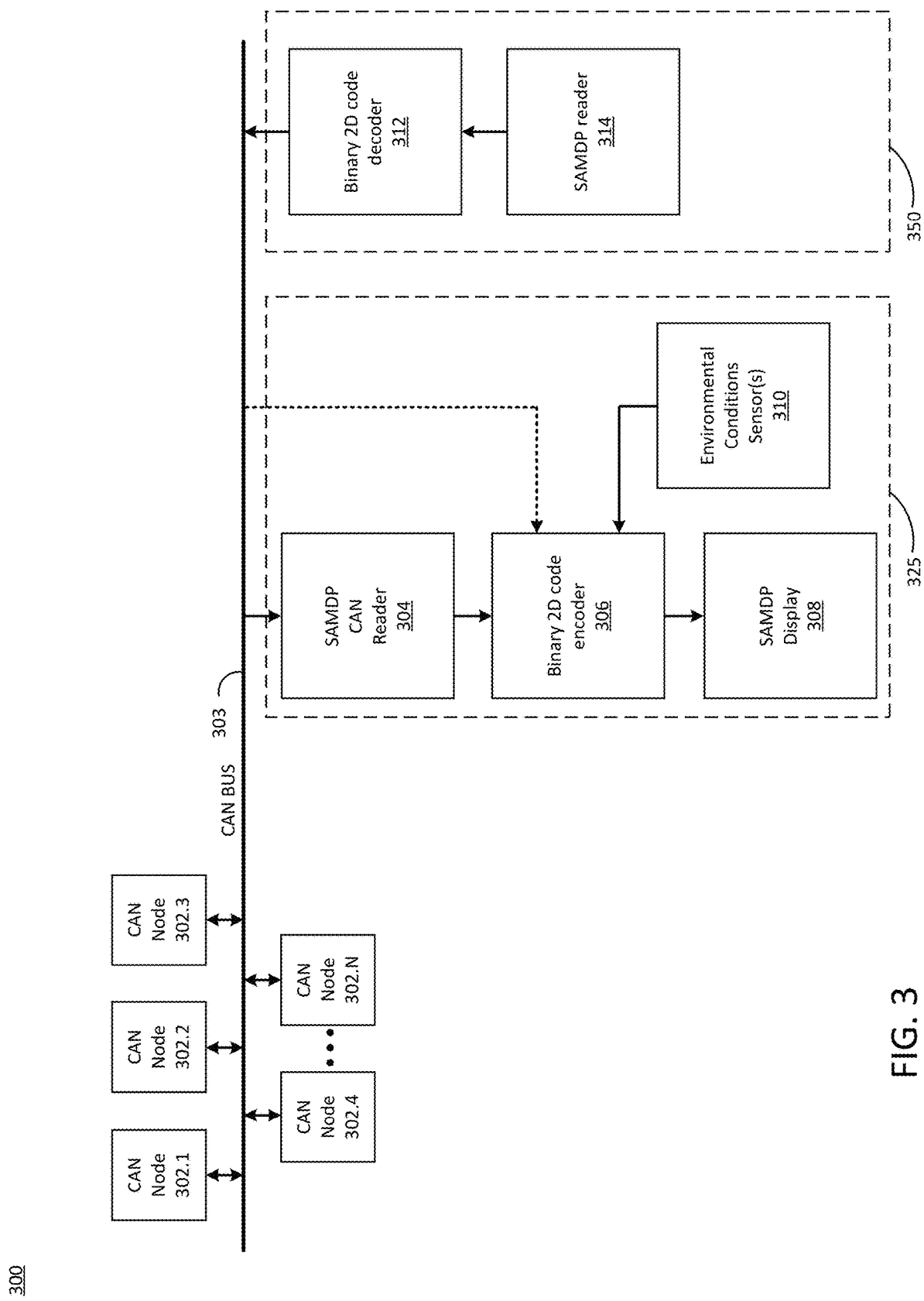
FIG. 3 illustrates a block diagram of an exemplary SAMDP system architecture, in accordance with an aspect of the disclosure.

FIG. 3 illustrates a block diagram of an exemplary SAMDP system architecture, in accordance with an aspect of the disclosure. The SAMDP system architecture 300 as shown in FIG. 3 may be implemented as part of a vehicle, and therefore includes any suitable number N of CAN nodes 302.1-302.N, each of which is coupled to a CAN bus 303 to allow communications via the CAN nodes and other portions of the vehicle. For example, the CAN bus 303 may typically be accessed via the OBD-II port or at other locations within the vehicle in which the SAMDP system architecture 100 may be implemented. The various CAN nodes 302.1-302.N as shown may represent various vehicle subsystems, sensors, electronic control units (ECUs), etc. The CAN nodes 302.1-302.N and the CAN bus 303 may be part of an autonomous or a non-autonomous vehicle, and be present regardless of whether the SAMDP system is implemented. However, by interfacing with the existing CAN bus 303 and CAN nodes 302.1-302.N, the SAMDP system aspects as described herein may obtain valuable information regarding the operational state of the vehicle (e.g. velocity, acceleration, sensor data from the drive shafts, etc.), as well as environmental data from the vehicle's own sensors (e.g., temperature, humidity, pressure, etc.). Moreover, vehicles may have different CAN nodes 302 depending upon the vehicles capabilities and whether the vehicle is equipped with any autonomous or driving assistance features.

In an aspect, the SAMDP system architecture 300 may be generally divided into an encoding portion 325 (e.g. a SAMDP encoder) and a decoding portion 350 (e.g. a SAMDP decoder). As shown in FIG. 3, the SAMDP encoding portion 325 includes a SAMDP reader 304, a binary 2D code encoder 306, a SAMDP display 308, and environmental condition sensor(s) 310. The SAMDP decoding portion 350 includes a binary 2D code decoder 312 and a SAMDP reader 314. Each of the blocks shown in the SAMDP encoding portion 325 and the SAMDP decoding portion 350 may include any suitable number and type of hardware and/or software, which may work in conjunction with one another to realize their respective functions. For instance, one or more of the blocks shown in the SAMDP encoding portion 325 and the SAMDP decoding portion 350 may be configured as one or more hardware processors and/or circuitry, specific hardware components (e.g. sensors, field-programmable gate arrays (FPGAs), application specific integrated circuits (ASICs), discrete hardware components, controllers, microcontrollers, etc. The various details associated with the interconnections among these components is not shown for purposes of brevity, but the flow of data and respective processing steps are shown in FIG. 3 with the use of arrows and is further described herein.

As another example, one or more of the blocks shown in the SAMDP encoding portion 325 and/or the SAMDP decoding portion 350 may include and/or access a suitable storage medium such as a non-volatile or volatile memory, which may include non-transitory computer-readable media. In various aspects, respective components of the SAMDP encoding portion 325 and/or the SAMDP decoding portion 350 may perform their respective functions by accessing a non-transitory computer readable having computer-readable instructions stored thereon, and in doing so execute the various respective functionality of each component as further discussed herein (e.g., via execution of the instructions by one or more processors associated with one or more of the aforementioned components of the SAMDP encoding portion 325 and/or the SAMDP decoding portion 350).

Additionally or alternatively, the SAMDP encoding portion 325 and/or the SAMDP decoding portion 350 may constitute one or more portions of (or the entirety of) a control system implemented via a vehicle in which the SAMDP system architecture 300 is implemented. For instance, the SAMDP decoding portion 350 may provide decoded data unit values to one or more portions of the vehicle via the CAN bus 303 or other suitable means as discussed herein. The vehicle may implement one or more control units that calculate and perform various levels of assisted driving functionality using the decoded data unit values. Thus, the aspects described herein include a vehicle incorporating the SAMDP system architecture 300, which may include a control system that communicates with and/or implements the SAMDP encoding portion 325 and/or the SAMDP decoding portion 350.

With respect to the decoding portion 350, the SAMDP reader 314 may be implemented as a binary two-dimensional (2D) code reader that includes or more suitable camera systems configured to detect 2D patterns that are displayed via another vehicle's SAMDP system. For example, the SAMDP reader 314 may be implemented as a camera that is integrated as part of the vehicle in which the SAMDP system is implemented, a dedicated camera system mounted external to the vehicle (e.g. next to the license plate on the outside of the vehicle), or mounted internally within the vehicle. Regardless of the particular implementation of the SAMDP reader 314, aspects include the SAMDP reader 314 recognizing and providing image data associated with a binary 2D image read from another SAMDP system to the binary 2D code decoder 312, which decodes the encoded messages and then provides this information to other vehicle systems via the CAN bus 303. For example, if the 2D pattern is a quick response (QR) code, then the SAMDP reader may be configured as any suitable type of imaging system, camera, etc., to detect and decode displayed QR code information.

As further discussed below, the information decoded from other SAMDP 2D codes in this way may be particularly useful for autonomous vehicles, as this data may provide valuable information to greatly improve upon the accuracy of safety driving model parameter calculations (e.g., the longitudinal minimum distance). Thus, one or more of the CAN nodes 302.1-302.N may be implemented as various control systems associated with an autonomous vehicle, in which case these components may retrieve and process the decoded information sent over the CAN bus 303 via the binary 2D code decoder 312 to perform processing, calculations, and execute decisions with regards to the control of the autonomous vehicle.

Turning now to the encoding portion 325, this portion of the SAMDP system architecture 300 interprets information from the vehicle's CAN bus 303 to encode a 2D binary pattern for display. To do so, the encoding portion 325 includes an SAMDP CAN reader 304, which may interface with the CAN bus 303 to receive and identify vehicle data that includes information relevant to encoding the 2D binary pattern, which may include information related to the operational state of the vehicle in which the SAMDP CAN reader 304 is implemented. For instance, the SAMDP CAN reader 304 may be configured to periodically or continuously receive vehicle data such as the vehicle's current velocity from the CAN bus 303. As another example, the vehicle data may include data used to calculate other safety driving model parameters such as the estimated friction coefficient $\mu$ and the combined braking efficiency and friction uncertainty factor $\alpha$, as discussed herein. In other words, the aspects as described herein enable the 2D patterns to be dynamically updated as new information is obtained via the CAN bus 303 and/or the environmental condition sensor(s) 310 as further discussed below.

In other words, the data received via the CAN bus may be associated with one or more of the available sensors connected to the CAN bus 303 and/or from other Electronic Control Units (ECUs), as noted above, which may be configured to perform sensor fusion capabilities. In accordance with the various aspects as described herein, there are several methods to calculate the parameters that are to be encoded as part of the 2D pattern, which may include the safety driving model parameters as noted above. These parameters may be calculated by the various ECUs or other suitable opponents connected to the CAN bus 303, which may then be transmitted via the CAN bus 303 and received via the SAMDP CAN bus reader 304. Alternatively, the SAMDP CAN bus reader 304, or another suitable component of the SAMDP system architecture 300, may perform such calculations. An illustrative example of the calculation of the friction coefficient $\mu$ may be found in the reference Khaleghian, S. Emami, A. & Taheri, S. (2017), "A technical survey on tire-road friction estimation. Friction, 5(2), 123-146; found at https://link.springer.com/article/10.1007/s40544-017-0151-0.

The environment conditions sensor(s) 310 may include any suitable number and type of sensors that are configured to measure conditions internal and/or external to the vehicle in which the SAMDP system architecture 300 is implemented. In the aspects described herein, the current environment may be used by the binary 2D code encoder 306 to determine, due to visibility conditions, the difficulty that another SAMDP reader may have when attempting to read a displayed 2D pattern and to encode a specific type of message based upon this determination. Thus, the environment conditions sensor(s) 310 may include sensors suitable for this purpose such as, for instance, one or more barometers, hygrometers, thermometers, cameras, etc. The binary 2D code encoder 306 may receive the sensor data from the environment conditions sensor(s) 310 as input to facilitate the determination of the current environmental conditions such as snow, rain, fog, dust, humidity, etc. Moreover, the binary 2D code encoder 306 may additionally or alternatively receive sensor data from the vehicle's own sensor's via the CAN bus 303, as shown by the broken line in FIG. 3. In this way, the SAMDP system architecture 300 may be implemented in any type of vehicle with a CAN bus system, but may be further customized for vehicles that already generate specific types of sensor input and/or sensor data that may be more accurate than the sensors included as part of the environment conditions sensor(s) 310.

Furthermore, although the aspects are described herein with respect to the SAMDP system architecture 300 utilizing the CAN bus 303 to receive vehicle state information (e.g., via the SAMDP CAN reader 304) and/or environmental conditions, and to provide decoded data unit values (e.g., safety driving model parameter values) to the CAN bus 303 (e.g., via the binary 2D code decoder 312) the aspects are not limited to these particular examples or require that a CAN bus be used or otherwise be present. For instance, aspects include the SAMDP system architecture 300 implementing other suitable electronic components such as a drive-by-wire system or other electronic devices (e.g., aftermarket components), which may or may not be connected to or communicate with the CAN bus 303.

Additionally or alternatively, these electronic components may communicate with the CAN bus 303 and/or other components of the SAMDP system architecture 300 via wired and/or wireless communications (which may require the use of a CAN bus to wireless adapter that is not shown for brevity). Thus, the aspects described herein include the binary 2D code encoder 306 receiving vehicle state information and/or environmental conditions from such electronic components and/or the CAN bus 303 to obtain the appropriate information to encode the data units as 2D patterns. Additionally or alternatively, the aspects described herein include the binary 2D code decoder transmitting decoded data unit values to such electronic components and/or the CAN bus 303, which may then utilize the decoded data values in any suitable manner as discussed herein.

In various aspects, the binary 2D code encoder 306 may be implemented as any suitable type of 2D code encoder to generate a resulting 2D binary pattern of any suitable type that may be read by other SAMDP reader systems. For instance, the binary 2D code encoder 306 may encode data as discussed herein to generate a corresponding 2D binary code such as a QR code, a datamatrix code, a PDF417 code, an Aztec code, etc. In any event, aspects include the binary 2D code encoder 306 being implemented as a matrix code encoder that considers the environmental conditions via the various sensory input data to calculate the amount of information that can be encoded and thus shared with other vehicles. For example, in the presence of challenging environmental situations (e.g., heavy rain or snow) in which there is a greater likelihood of data loss when the 2D code is read by another SAMDP system, the 2D code can be encoded to contain less information but account for a better visual-bit resolution such that the decoding of the information is more robust. The generated 2D binary patterns may then be displayed via the SAMDP display 308, which again may be implemented as any suitable type of display such as a passive or active display, an LCD display, etc., and as mentioned above may be part of a license plate display associated with the vehicle in which the SAMDP system architecture 300 is implemented or as a separate display.

As further discussed below, once a determination is made regarding the current environmental conditions, the binary 2D code encoder 306 generates several binary 2D patterns (e.g., quick response (QR) codes), with the encoded binary code for each 2D pattern representing a separate channel. Each of these 2D patterns may contain a specific amount and type of data based upon the detected environmental conditions as well a predetermined range for which another vehicle's SAMDP system is expected to be able to read and decode the encoded data. In other words, and as discussed in further detail below with respect the use of the adaptive communication protocol, the binary 2D code encoder 306 may dynamically generate 2D codes having varying visual-bit resolutions and specific error correction levels (e.g., QR code error correction) based upon the likelihood that the encoded data will be successfully read by other vehicles. The separate 2D pattern for each channel may each be displayed at the same time as separate visual channels via the use of spectral multiplexing, as further discussed below.

As an illustrative example with respect to the use of varying visual-bit resolutions used for the 2D patterns, the binary 2D code encoder 306 may generate 2D codes that fill a predetermined region of a displayable area of the SAMDP display 308. This predetermined region of the SAMDP display 308 may have a two-dimensional area of width and length of dimensions equal to w×l. A 2D pattern may thus be generated within this area by binarizing each cell displayed within a grid having a specific size occupying the predetermined region such that each cell within the grid represents a single visual bit having a value of zero or one. Thus, for a higher resolution 2D pattern, which can encode more information, the predetermined region is filled with visual bits that are physically smaller than the visual bits associated with a lower resolution 2D pattern, which encodes less information. However, the area of the predetermined region of the SAMDP display 308 that is occupied by both higher resolution and lower resolution 2D patterns remains the same in each case. The techniques used by the SAMDP system architecture 300 to determine the resolution of each 2D pattern for each channel of the multispectral displayed 2D pattern, as well as the content and format of the encoded data is further described in detail below with respect to the use of the adaptive communication protocol.

Adaptive Communication Protocol

In an aspect, to determine how to encode the 2D pattern, the binary 2D code encoder 306 first determines the capacity of the message to be transmitted (i.e. encoded). To do so, the binary 2D code encoder 306 determines the current environmental conditions as noted above. The binary 2D code encoder 306 also determines a distance and viewing angle of any potential receivers that may be potential recipients of the encoded message represented by the 2D pattern. This may be determined, for example, using sensor data obtained via the CAN bus 303 (e.g. lidar and radar data). In aspects in which a vehicle implementing the SAMDP system lacks such sensor capabilities, the distance and view angle may be established as default or predetermined values.

Then, based upon the environmental conditions and the distance and viewing angle of potential recipient vehicles, the binary 2D code encoder 306 selects two free message parameters that control the available size of the message that may be encoded. The first of these message parameters includes the aforementioned grid size, which impacts the size of the visual bits in the encoded 2D pattern. For example, typical 2D grid sizes range between 21×21 to 177×177, which represents the number of cells within the 2D grid that are occupied by respective visual bits. Next, the binary 2D code encoder 306 calculates a code correction percentage, which is a percentage of damaged cells that a recipient SAMDP decoder can auto-correct. A typical range for the code correction percentage may be in a range of 7%-30%. Once these free parameters are determined, the remaining space available for encoding a specific message allows for the determination of the size and content of the message using this available remaining data space that may be encoded as a 2D pattern.

Again, the combination of environmental conditions, distance, and viewing angle of each potential message recipient enables the identification of the size and content of an encoded message represented by a 2D pattern. Thus, 2D patterns may (but do not have to) have different resolutions (i.e. different visual bit sizes) and thus contain different amounts of and/or different types of encoded information based upon a combination of these factors. As further described below, aspects include the use of the adaptive communication protocol to generate different encoded messages, with the content of each message being correlated to a different combination of the aforementioned factors to better ensure that vehicles at varying ranges can still decode some relevant information provided in the encoded messages. And because each potential message recipient is exposed to the same environmental conditions, once the current environmental conditions are classified, the corresponding 2D patterns may be generated with a specific amount and type of information for that environmental condition classification at different surrounding agent (e.g. surrounding vehicle) ranges. These different vehicle ranges may be, for example, based upon predetermined thresholds and/or knowledge of the operation of SAMDP readers and their range limits. For instance, distance thresholds may be established based on the capabilities of commercial cameras/sensors for ADAS equipped vehicles such as sensor range, resolution, etc., which may correspond to the SAMDP reader 314 as discussed herein with reference to FIG. 3.

Figure 4A:
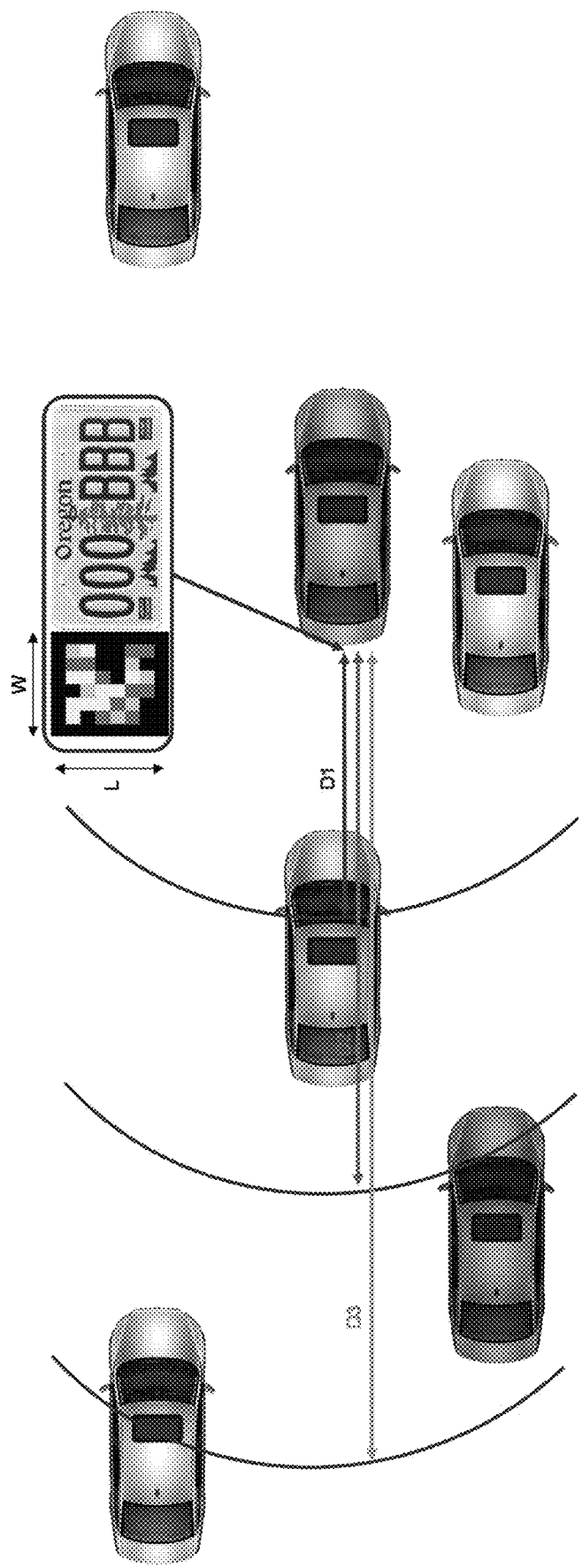
FIG. 4A illustrates a map showing example distance thresholds for RGB spectral multiplexing using 2D binary patterns, in accordance with an aspect of the disclosure.
Figure 4B:
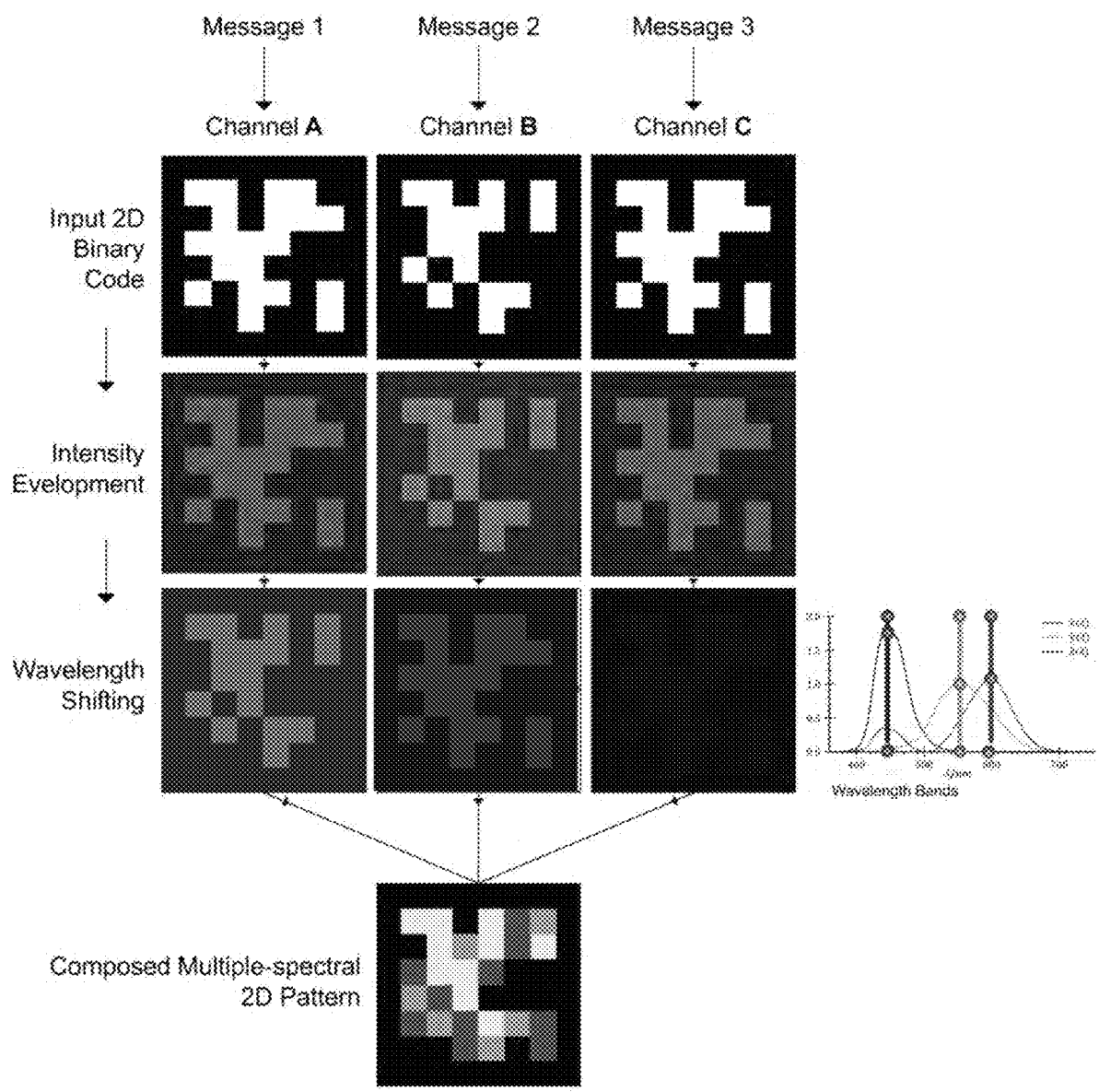
FIG. 4B illustrates an exemplary multi-spectral RGB 2D binary pattern, in accordance with an aspect of the disclosure.

Therefore, referring now to FIG. 4A, an example of these different distance thresholds is shown, which are represented as D1 (short distance), D2 (medium distance), and D3 (long distance). As shown in FIG. 4B, aspects include a single composite or multispectral 2D pattern being generated that simultaneously represents a combination of separate 2D patterns, each representing a separate message channel and containing a respectively encoded message associated with each aforementioned distance threshold. As shown in FIG. 4B and further described in detail below, each message channel (e.g., channels A, B, and C as shown in FIG. 4B) thus represents a message corresponding to the classified environmental condition and the particular distance, or range, calculated for groups of other vehicles attempting to read the messages. In other words, each message channel is associated with a separate 2D pattern that contains a different encoded message, with each message containing a different amount and/or type of encoded data based upon each respective distance threshold. In an aspect, this multispectral 2D pattern may leverage the use of different wavelengths (i.e. colors) per channel to achieve spectral multiplexing, thus concurrently presenting the information from all channels as part of a single composite 2D pattern, as further discussed below with respect to FIG. 4B.

With reference to FIG. 4B, it is noted that the channelized message codes as shown are by way of example and ease of explanation. For instance, FIG. 4B shows the use of three channels, although aspects include the use of any suitable number and type of colors for spectral multiplexing of 2D patterns in this manner. Moreover, the example channelized messages shown in FIG. 4B are illustrated as having the same resolution (i.e. the same sized visual bits) for each one, although the aspects as described herein include each channelized message having a different resolution, which may be the case when some of the channelized messages (e.g., channel C) contains mode encoded data than other channelized messages (e.g. A and B), as determined via the use of the adaptive communication protocol.

Nonetheless, the use of red (R), green (G), and blue (B) for each channelized message may be particularly advantageous given that camera systems, which may be implemented as the SAMDP readers, have significant separation between each of these wavelength bands, and thus may effectively function as wavelength band filters to separately extract, from a single composite 2D pattern, the encoded message from each channel. Thus, a vehicle implementing the SAMDP system as described herein (e.g., the SAMDP decoder 350 including the SAMDP reader 314 and binary 2D code decoder 312) may advantageously separate or filter the channelized encoded 2D messages by their respective wavelengths to attempt to decode each one. In the event that a vehicle is able to use the SAMDP system to decode more than one of these encoded channelized messages, the SAMDP system may, in an aspect, obtain decoded safety driving model parameters for each successfully decoded message and utilize the safety driving model parameters from the encoded message that yielded the most decoded information (e.g. the largest encoded message length of the successfully decoded channelized messages).

Continuing the example as shown in FIG. 4A and the use of the RGB spectral multiplexing for message encoding, a different wavelength is associated with each distance threshold. Although any wavelength can be sued for any of the messages, in an aspect, these wavelengths are assigned to optimize the quantum efficiency of the receptive cameras as shown in the wave-length/bands plot in the right side of FIG. 4B, with green being the highest, red being the next highest, and blue being the lowest. This also ensures the algorithms and hardware needed to decode the information encoded into the 2D patterns are achievable using low cost and widely available camera sensors. As an illustrative example, the short range (D1) message may have the highest resolution (i.e. the smallest visual bits) given it is intended for closer vehicles, and thus contain the most information. Thus, the short range message may be generated using the blue wavelength as a lower camera efficiency to this wavelength band is acceptable to ensure that the message will be successfully decoded by nearby vehicles, whereas the medium distance (D2) and long distance (D3) messages may have a lower resolution (i.e. larger visual bits) given that these are intended for vehicles that are further way, contain less information, and thus be encoded using the green and red colors to help ensure that this information is decoded based upon the increased camera sensitivity to these wavelength bands.

In an aspect, the binary 2D code encoder 306 calculates the visual-bit resolution to represent each message that is to be encoded as a 2D pattern as an image, $Image_i$, needed at each distance $d_i$ (D1, D2, and D3) using a point spread function (PSF) that contemplates the width and length w, l of the predetermined region of the SAMDP display 308 in which the 2D patterns are to be presented, and the environmental conditions c as represented by Equation 2 below as follows:

$$Image_i^{res} = PSF(w, l, d_i, \varepsilon) \quad \text{Eqn. 2:}$$

Based on this function, the binary 2D code encoder 306 may thus define 3 bands with a resolution overlap so vehicles within the transition distance between the defined ranges D1, D2, D3 can reliably capture information encoded in at least one of the 2D pattern message channels in a specific wavelength (e.g., one of the R, G, and B wavelengths noted above).

In an aspect, once the capacity of each message to be encoded for each range D1, D2, D3 (and for the current environmental conditions as noted above) is computed, the vehicle state information is encoded using an adaptive communication protocol, as further discussed below with reference to FIGS. 6-8. Further in accordance with such aspects, the encoded information may correspond to one or more safety driving model parameters, which may be used by trailing vehicles to improve their estimation of the safe distance. These safety driving model parameters are defined as follows.

µ: Estimated friction coefficient. This is generally the most useful safety driving model parameter, and thus the transmission of this parameter is prioritized by the adaptive communication protocol. The safety driving model parameter expressing the maximum braking force is factorized in this idea in Equation 3 below as follows:

$$\beta_{max} = \mu \alpha \quad \text{Eqn. 3:}$$

α: Combined braking efficiency and friction uncertainty factor. This parameter is used to compute better safety distances. When this value is not available, the friction uncertainty factor is already integrated into µ, and α is estimated to be 1.

v: Current velocity. This is typically a lower priority parameter because it is expected that the trailing vehicle has the means by which to obtain this value through its own sensors.

In various aspects, each of the safety driving model parameters µ, α may be calculated in any suitable manner using data available from the vehicle's CAN bus as noted above. For instance, the estimated friction coefficient µ may be calculated using known techniques for such safety driving model parameter calculations as described above (e.g. as described in the Khaleghian reference), which include the use of drive shaft data obtained via the vehicle's CAN bus, and/or other suitable intrinsic or extrinsic calculation techniques.

Again, aspects include the use of a different channel depending upon the particular distance region (e.g. D1, D2, D3) that is targeted for each encoded message, with each channelized message thus containing a different amount and/or type of information. In the examples that follow, the variation in encoded information among these different channelized messages is with respect to whether each of the aforementioned safety driving model parameters µ, α, and v are encoded and, when a particular safety driving model parameter is present, the resolution of bits used to represent that particular safety driving model parameter in floating point format. However, the aspects described herein are not limited to these examples, and any other suitable type of information may be encoded into the channelized messages. Thus, aspects include the overall process of identifying how to encode each of the channelized messages to display a composite 2D pattern using an adaptive communication protocol that may encode any suitable type of information that may be relevant or otherwise useful to other agents decoding the information, depending upon the particular application and use. Examples of the data structure or data frames used for message encoding for each of the 2D patterns is further discussed in detail below with reference to FIG. 5.

Figure 5:
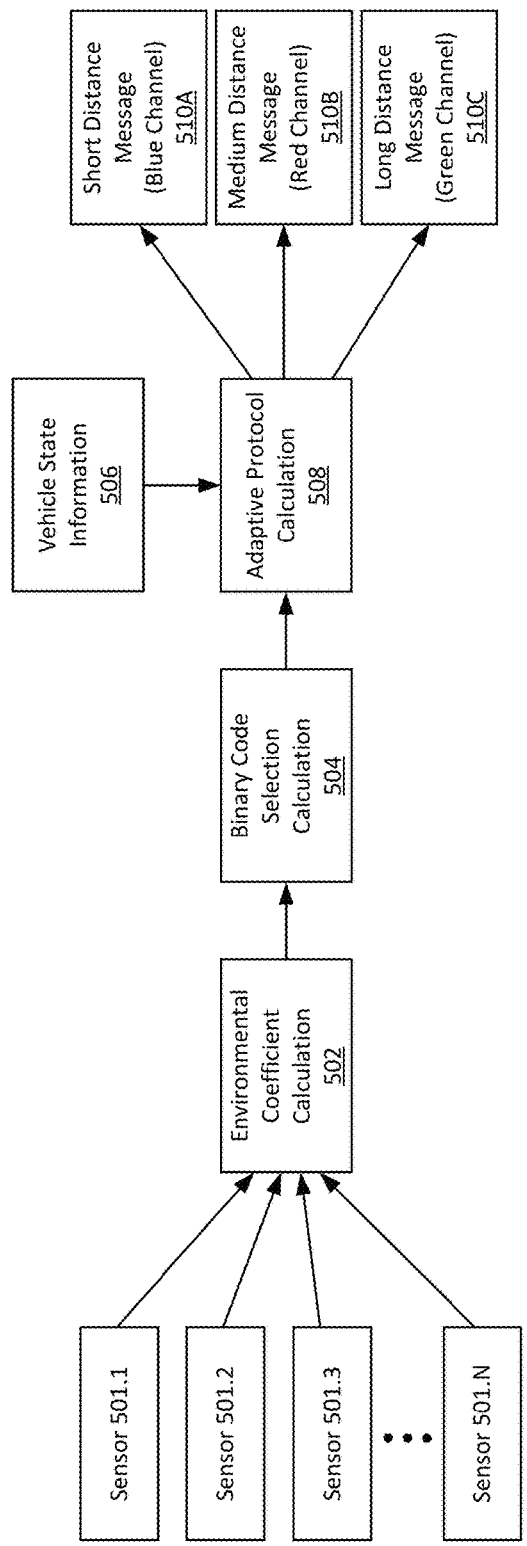
FIG. 5 illustrates an exemplary flow chart for an adaptive communication protocol used for encoding data in 2D binary patterns, in accordance with an aspect of the disclosure.

FIG. 5 illustrates an exemplary flow chart for an adaptive state transmission protocol, in accordance with an aspect of the disclosure. The adaptive state transmission protocol as shown in FIG. 5 is an example of the steps used by the SAMDP system architecture 300 to facilitate the adaptive communication protocol as discussed herein for encoding separate channelized messages. As shown in FIG. 5, flow 500 begins using environmental data provided by any suitable number of sensors 501.1-501.N. These sensors may be, for instance, associated with the environmental conditions sensor 310 and/or obtained via data available from the CAN bus 303, as discussed above with respect to FIG. 3. Thus, the sensors 501.1501.N may include, for instance, a barometer, a hygrometer, a thermometer, etc., which provide data signals (e.g., digital data) representing various sensor values such as humidity, pressure, temperature, etc.

Referring back to FIG. 5, the environmental coefficient calculation block 502, the binary code selection calculation block 504, and the adaptive protocol calculation block 508 may provide their respective functions via any suitable number and/or type of processors or other suitable hardware and/or software components. For instance, the functionality associated with each of these blocks may be identified with the binary 2D code encoder 306, as shown and discussed above with respect to FIG. 3.

In an aspect, the environmental coefficient calculation block 502 receives the sensor data from the sensors 501.1-501.N and uses this information to generate a classification of the current environmental conditions. As an illustrative example, a combination of temperature, pressure, and humidity data may be correlated to one or more predetermined groups of data ranges to generate this classification from among any suitable number. For instance, the environmental sensor data may be used to classify the current environmental condition as best, good, bad, or worst, which may each represent a numeric value (e.g., 0, 1, 2, 3, etc.) that correlates to the expected visibility in each case and, in turn, the likelihood that a message will be read in such environmental conditions by other vehicles at various ranges. Of course, additional or less classifications may be used depending upon the desired application, accuracy, etc.

Next, the binary code selection calculation block 504 correlates the numeric value represented by the classified environmental condition (e.g., best, good, bad, worst) to a specific predetermined format for constructing a corresponding message within each channel. In other words, as shown in FIGS. 6-8 and discussed in further detail below, each channelized message may be potentially encoded in four different ways (one for each classified environmental condition type among the four available in this example).

The binary code selection calculation block 504 selects, for each channelized message, a corresponding data frame structure that identifies which safety driving model parameters are to be encoded as part of the 2D message and the amount of data bits to use for each safety driving model parameter that is encoded based upon the classified environmental condition.

To do so, aspects include the classified environmental condition being used to identify a level of error code correction for generating each channelized message in accordance with the particular type of 2D pattern that is implemented. For example, if a QR pattern is used, then an amount of QR error correction (ECC) may be calculated based upon the classified environmental condition in combination with the distance to each target recipient of the message. In other words, a greater amount of ECC may be allocated for medium and long distance messages compared to short distance messages, and a greater amount of ECC may also be allocated for worsening environmental conditions within each of the short, medium, and long distance message types.

Figure 7:
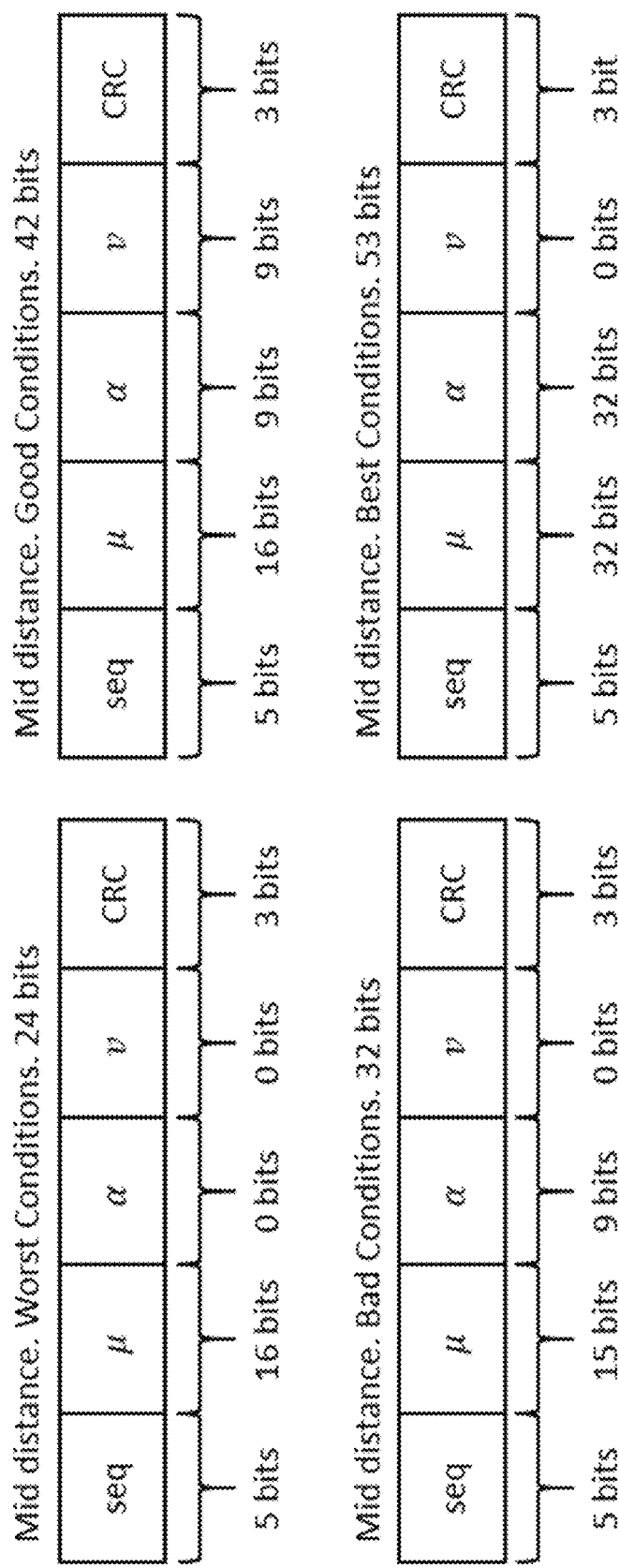
FIG. 7 illustrates exemplary medium distance message frames to be encoded into a 2D binary pattern for different environmental conditions, in accordance with an aspect of the disclosure.
Figure 8:
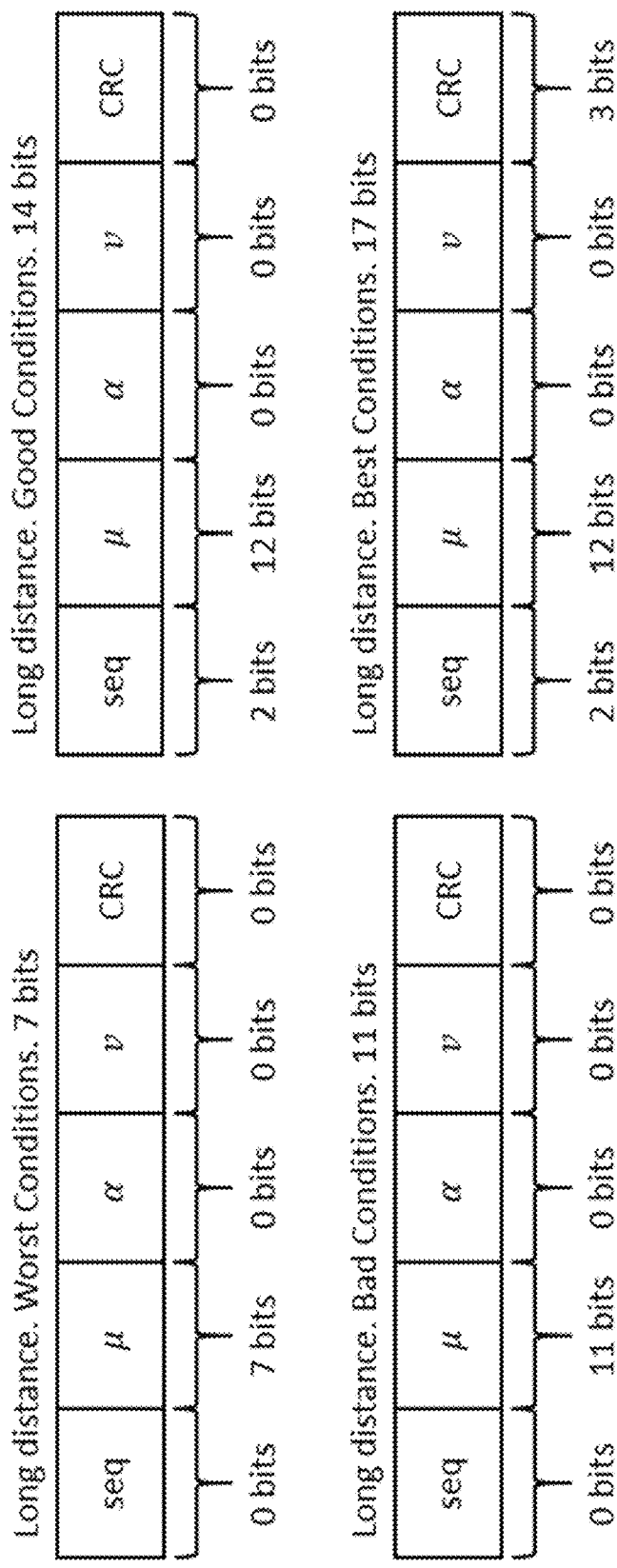
FIG. 8 illustrates exemplary long distance message frames to be encoded into a 2D binary pattern for different environmental conditions, in accordance with an aspect of the disclosure.

In this way, twelve different example data frame structures as shown in in FIGS. 6-8 represent different permutations of available remaining data for encoding purposes once the ECC data is allocated. For example, the best condition for the short distance message shown in FIG. 6 uses 134 bits of data for encoding purposes, as a minimal amount of the encoding data is dedicated for error correction in this example. In contrast, the worst condition for the long distance message shown in FIG. 8 uses 7 bits of data for encoding purposes, as the majority of available encoding data is dedicated to providing the maximum amount of error correction in this example.

Once a specific data structure is chosen for each channelized message, the adaptive protocol calculation block 508 functions to encode, for each channelized message 510A, 510B, 510C, data according to the selected data frame structure. To do so, the vehicle state information 506 may be used to calculate the safety driving model parameters $\mu$, $\alpha$, and $\nu$, one or more of which are then encoded into each respective channelized message based upon the corresponding data frame structure as shown in FIGS. 6-8. Again, the vehicle state information may be derived from communications with the CAN bus 303 via the SAMDP CAN reader 304, as shown and described above with respect to FIG. 3.

Thus, aspects include each channelized message 510A, 510B, 510C containing an encoded message that is selected in accordance with one of the four classified environmental condition types. Again, continuing the previous example of four classified environmental conditions and three message channels, the overall number of different message types available to be encoded in this manner is twelve (four potential messages for each classified environmental condition type per message channel). Examples of each of these twelve different message types are shown in further detail in FIGS. 6-8. Aspects include using any suitable number of both message channels and classified environmental conditions, although the example of twelve total messages may strike an adequate balance between accuracy and performance.

Turning now to specific data frame structure examples, FIG. 6 shows examples of four different data frame structures corresponding to different message encodings, one for each classified environmental condition as noted above for the short range messages (e.g. the blue channel C as shown in FIG. 4B), FIG. 7 shows examples of four different data frame structures for each classified environmental condition for the medium range messages (e.g. the red channel B as shown in FIG. 4B), and FIG. 8 shows examples of four different data structures for each classified environmental condition for the long range messages (e.g. the green channel A as shown in FIG. 4B).

As can be seen from FIGS. 6-8, the data frame structures are established to prioritize the transmission of certain safety driving model parameters over others. For instance, and as noted above, when additional ECC is needed and some of the available encoding data needs to be sacrificed such that it is not possible to encode each of the safety driving model parameters, the estimated friction coefficient is $\mu$ is prioritized, followed by the transmission of the combined braking efficiency and friction uncertainty factor $\alpha$, which is followed by the lowest priority safety driving model parameter $\nu$ corresponding to the current velocity of the vehicle.

For instance, as shown in FIG. 8, each of the long range messages only encodes the estimated friction coefficient $\mu$ regardless of the environmental conditions, although the resolution for representing the estimated friction coefficient g in floating point format is increased from 7 bits to 12 bits as the environmental conditions improve. However, for the short and middle range messages as shown in FIGS. 6 and 7, the safety driving model parameters $\alpha$ and $\nu$ may additionally be encoded as environmental conditions improve, in addition to increasing the resolution or number of bits used to represent these safety driving model parameters.

Thus, the data frame structures as shown in FIGS. 6-8 may also prioritize an accuracy, or resolution, in which particular safety driving model parameters may be encoded into each channelized message. For example, as additional data becomes available in each of the short, middle, and long range data structure groups, additional bits may be allocated to the representation of the safety driving model parameters so that these may be more accurately represented. As an illustrative example, the safety driving model parameters may be represented in floating point format, with additional bits being used to extend the representation of a respective safety driving model parameters in floating point format. In an aspect, these additional bits may be allocated in a manner that mirrors the aforementioned prioritization of the $\mu$, $\alpha$, and $\nu$ safety driving model parameters. That is, as additional bits become available for use (i.e. due to the use of less bits for ECC) the safety driving model parameter $\mu$ may be more accurately encoded, followed by the safety driving model parameters $\alpha$ and $\nu$.

In an aspect, the data frame structures as shown in FIGS. 6-8 may be defined in a manner that not only prioritizes which safety driving model parameters are encoded into each channelized message and their encoded level of accuracy in terms of bits, but also prioritize the use of other data to help ensure that the information is properly decoded by a target SAMDP system recipient. For example, the data frame structures as shown in FIGS. 6-8 also include a sequential field (seq) and a cyclic-redundancy check (CRC) field. In an aspect, the seq field is populated by a random number generated each time a new frame (i.e. data structure) is populated as part of the data encoded into a newly generated 2D pattern, and thus may be used by a recipient of the encoded message as a "keep alive" signal to assert that the transmitter is actively updating the data displayed in the binary code. Thus, although it is preferable to send the seq code with each newly encoded message, this information may be dropped in favor of other data as shown in FIGS. 6-8. Similarly, the CRC field may be reduced in bit size or dropped completely in favor of providing other safety driving model parameters or using more bits to represent specific safety driving model parameters (e.g. $\mu$).

Of note, none of the data structures provided in FIGS. 6-8, which again represent the data to be encoded into a 2D pattern, specify a message type. This is because the decoding of the binary codes provides the size and ECC used, which is an injective map to the type of message used and thus the type of message is not needed.

EXAMPLES

The following examples pertain to further aspects.

Example 1 is a self-adaptive multiresolution digital plate (SAMDP) encoder associated with a vehicle, the SAMDP encoder comprising: a controller area network (CAN) bus reader configured to receive vehicle data regarding an operational state of the vehicle via the CAN bus; and a binary two-dimensional (2D) code encoder configured to calculate one or more parameters using the vehicle data and to encode at least one of the one or more parameters as part of a set of messages represented by respective 2D binary-encoded patterns, wherein each one of the set of 2D binary-encoded patterns represents a separately encoded message including one or more of the one or more parameters, and wherein the binary 2D code encoder is further configured to encode each one of the set of 2D binary-encoded patterns in accordance with a different visible wavelength such to form a single composite multispectral 2D binary-encoded pattern when the set of 2D binary-encoded patterns is concurrently displayed.

In Example 2, the subject matter of Example 1, wherein the binary 2D code encoder is further configured to classify a current environmental condition based upon sensor data, and wherein the binary 2D code encoder is further configured to encode the set of messages based upon the classified current environmental condition.

In Example 3, the subject matter of any combination of Examples 1-2, wherein the binary 2D code encoder is further configured to encode each separately encoded message based upon a different predetermined distance between the vehicle and surrounding agents attempting to read the single composite multispectral 2D binary-encoded pattern.

In Example 4, the subject matter of any combination of Examples 1-3, wherein the binary 2D code encoder is further configured to encode each separate encoded message to have a different message size based upon a combination of the classified current environmental condition and the different predetermined distances to the surrounding agents.

In Example 5, the subject matter of any combination of Examples 1-4, wherein each one of the set of 2D binary-encoded patterns is associated with a different resolution.

In Example 6, the subject matter of any combination of Examples 1-5, wherein the one or more of the one or more parameters are safety driving model parameters that include one or more of an estimated friction coefficient $\mu$, a combined braking efficiency and friction uncertainty factor $\alpha$, and a velocity v of the vehicle.

In Example 7, the subject matter of any combination of Examples 1-6, wherein the binary 2D code encoder is further configured to encode each separate encoded message according to a different data frame structure.

In Example 8, the subject matter of any combination of Examples 1-7, wherein the binary 2D code encoder is further configured to classify a current environmental condition based upon sensor data and to encode each separate encoded message based upon the classified current environmental condition, wherein a size of messages encoded for better classified environmental conditions are larger than messages encoded for worse classified environmental conditions.

Example 9 is a self-adaptive multiresolution digital plate (SAMDP) decoder associated with a vehicle, the SAMDP decoder comprising: a binary two-dimensional (2D) code reader configured to detect a composite multispectral 2D binary-encoded pattern that includes a set of concurrently-displayed 2D binary-encoded patterns, each of the set of concurrently-displayed 2D patterns being encoded in accordance with a different visible wavelength; and a binary 2D code decoder configured to attempt to decode an encoded message associated with each respective one of the set of the concurrently-displayed 2D binary-encoded patterns to obtain respective sets of one or more data units for each successfully decoded message, wherein the one or more data units are based upon vehicle data regarding an operational state of another vehicle, and wherein the binary 2D code decoder is further configured to transmit, to one or more electronic components associated with the vehicle, the one or more data units associated with one of the successfully decoded messages having a longest message length.

In Example 10, the subject matter of Example 9, wherein the concurrently-displayed 2D binary-encoded patterns include a first 2D binary-encoded pattern that is encoded in accordance with a blue wavelength band, a second 2D binary-encoded pattern that is encoded in accordance with a red wavelength band, and a third 2D binary-encoded pattern is encoded in accordance with a green wavelength band.

In Example 11, the subject matter of any combination of Examples 9-10, wherein each one of the concurrently-displayed 2D patterns has a different resolution.

In Example 12, the subject matter of any combination of Examples 9-11, wherein the first 2D binary-encoded pattern has a higher resolution than the second 2D binary-encoded pattern, which has a higher resolution than the third 2D binary-encoded pattern.

In Example 13, the subject matter of any combination of Examples 9-12, wherein the first 2D binary-encoded pattern represents a first encoded message having a message length that is longer than that of a second encoded message represented by the second 2D binary-encoded pattern, which has a message length that is longer than that of a third encoded message represented by the third 2D binary-encoded pattern.

In Example 14, the subject matter of any combination of Examples 9-13, wherein the one or more of the one or more data units are safety driving model parameters that include one or more of an estimated friction coefficient $\mu$, a combined braking efficiency and friction uncertainty factor $\alpha$, and a velocity v of the other vehicle.

In Example 15, the subject matter of any combination of Examples 9-14, wherein each encoded message associated with each respective one of the set of the concurrently-displayed 2D binary-encoded patterns has a different data frame structure.

Example 16 is a non-transitory computer-readable media associated with a self-adaptive multiresolution digital plate (SAMDP) encoder having instructions stored thereon that, when executed by one or more processors, cause the SAMDP encoder to execute an adaptive communication protocol by: receiving vehicle data regarding an operational state of the vehicle via one or more electronic components associated with the vehicle; calculating one or more data units using the vehicle data; and encoding the one or more data units as part of a set of messages represented by respective 2D binary-encoded patterns, with each one of the set of 2D binary-encoded patterns representing a separately encoded message including at least one of the one or more data units, wherein each one of the set of 2D binary-encoded patterns is encoded in accordance with a different visible wavelength to form a single composite multispectral 2D binary-encoded pattern when the set of 2D binary-encoded patterns is concurrently displayed.

In Example 17, the subject matter of Example 16, further including instructions stored thereon that, when executed by one or more processors, cause the SAMDP encoder to execute an adaptive communication protocol by: classifying a current environmental condition based upon sensor data, the classified environmental condition representing a numeric value, wherein the act of encoding the one or more data units as part of a set of messages represented by respective 2D binary-encoded patterns includes encoding each of the one or more data units as a separate one of the set of messages based upon the numeric value representing the classified current environmental condition.

In Example 18, the subject matter of any combination of Examples 16-17, wherein the instructions to encode the one or more data units as part of a set of messages represented by respective 2D binary-encoded patterns includes instructions that, when executed by one or more processors, cause the SAMDP encoder to encode each encoded message based upon a different predetermined distance between the vehicle and surrounding agents attempting to read the single composite multispectral 2D binary-encoded pattern.

In Example 19, the subject matter of any combination of Examples 16-18, wherein the instructions to encode the one or more data units as part of a set of messages represented by respective 2D binary-encoded patterns includes instructions that, when executed by one or more processors, cause the SAMDP encoder to encode the one or more parameters as part of a set of messages represented by respective 2D binary-encoded patterns by encoding each separate encoded message to have a different message size based upon a combination of the numeric value representing the classified current environmental condition and the different predetermined distances.

In Example 20, the subject matter of any combination of Examples 16-19, wherein the one or more data units are safety driving model parameters that include one or more of an estimated friction coefficient $\mu$, a combined braking efficiency and friction uncertainty factor $\alpha$, and a velocity $v$ of the vehicle.

Example 21 is a control system configured to provide assisted driving features for a vehicle, the control system comprising: a binary two-dimensional (2D) code reader configured to detect a composite multispectral 2D binary-encoded pattern that includes a set of concurrently-displayed 2D binary-encoded patterns, each of the set of concurrently-displayed 2D patterns being encoded in accordance with a different visible wavelength; and a binary 2D code decoder configured to attempt to decode an encoded message associated with each respective one of the set of the concurrently-displayed 2D binary-encoded patterns to obtain respective sets of one or more data units for each successfully decoded message, wherein the one or more data units are based upon vehicle data regarding an operational state of another vehicle, and wherein the binary 2D code decoder is further configured to transmit, to one or more electronic components associated with the vehicle, the one or more data units associated with one of the successfully decoded messages having a longest message length.

In Example 22, the subject matter of Example 21, wherein the concurrently-displayed 2D binary-encoded patterns include a first 2D binary-encoded pattern that is encoded in accordance with a blue wavelength band, a second 2D binary-encoded pattern that is encoded in accordance with a red wavelength band, and a third 2D binary-encoded pattern is encoded in accordance with a green wavelength band, wherein the first 2D binary-encoded pattern has a higher resolution than the second 2D binary-encoded pattern, which has a higher resolution than the third 2D binary-encoded pattern, and wherein the first 2D binary-encoded pattern represents a first encoded message having a message length that is longer than that of a second encoded message represented by the second 2D binary-encoded pattern, which has a message length that is longer than that of a third encoded message represented by the third 2D binary-encoded pattern.

In Example 23, the subject matter of any combination of Examples 21-22, wherein each one of the concurrently-displayed 2D patterns has a different resolution, and wherein each encoded message associated with each respective one of the set of the concurrently-displayed 2D binary-encoded patterns has a different data frame structure.

In Example 24, the subject matter of any combination of Examples 21-23, wherein the one or more of the one or more data units are safety driving model parameters that include one or more of an estimated friction coefficient $\mu$, a combined braking efficiency and friction uncertainty factor $\alpha$, and a velocity $v$ of the other vehicle.

Example 25 is a self-adaptive multiresolution digital plate (SAMDP) encoder means associated with a vehicle, the SAMDP encoder means comprising: a controller area network (CAN) bus reader means for receiving vehicle data regarding an operational state of the vehicle via the CAN bus; and a binary two-dimensional (2D) code encoder means for calculating one or more parameters using the vehicle data and to encode at least one of the one or more parameters as part of a set of messages represented by respective 2D binary-encoded patterns, wherein each one of the set of 2D binary-encoded patterns represents a separately encoded message including one or more of the one or more parameters, and wherein the binary 2D code encoder means further encodes each one of the set of 2D binary-encoded patterns in accordance with a different visible wavelength such to form a single composite multispectral 2D binary-encoded pattern when the set of 2D binary-encoded patterns is concurrently displayed.

In Example 26, the subject matter of Example 25, wherein the binary 2D code encoder means classifies a current environmental condition based upon sensor data, and wherein the binary 2D code encoder means encodes the set of messages based upon the classified current environmental condition.

In Example 27, the subject matter of any combination of Examples 25-26, wherein the binary 2D code encoder means encodes each separately encoded message based upon a different predetermined distance between the vehicle and surrounding agents attempting to read the single composite multispectral 2D binary-encoded pattern.

In Example 28, the subject matter of any combination of Examples 25-27, wherein the binary 2D code encoder means encodes each separate encoded message to have a different message size based upon a combination of the classified current environmental condition and the different predetermined distances to the surrounding agents.

In Example 29, the subject matter of any combination of Examples 25-28, wherein each one of the set of 2D binary-encoded patterns is associated with a different resolution.

In Example 30, the subject matter of any combination of Examples 25-29, wherein the one or more of the one or more parameters are safety driving model parameters that include one or more of an estimated friction coefficient μ, a combined braking efficiency and friction uncertainty factor α, and a velocity v of the vehicle.

In Example 31, the subject matter of any combination of Examples 25-30, wherein the binary 2D code encoder means encodes each separate encoded message according to a different data frame structure.

In Example 32, the subject matter of any combination of Examples 25-31, wherein the binary 2D code encoder means classifies a current environmental condition based upon sensor data and encodes each separate encoded message based upon the classified current environmental condition, wherein a size of messages encoded for better classified environmental conditions are larger than messages encoded for worse classified environmental conditions.

Example 33 is a self-adaptive multiresolution digital plate (SAMDP) decoder means associated with a vehicle, the SAMDP decoder means comprising: a binary two-dimensional (2D) code reader means for detecting a composite multispectral 2D binary-encoded pattern that includes a set of concurrently-displayed 2D binary-encoded patterns, each of the set of concurrently-displayed 2D patterns being encoded in accordance with a different visible wavelength; and a binary 2D code decoder means for attempting to decode an encoded message associated with each respective one of the set of the concurrently-displayed 2D binary-encoded patterns to obtain respective sets of one or more data units for each successfully decoded message, wherein the one or more data units are based upon vehicle data regarding an operational state of another vehicle, and wherein the binary 2D code decoder means transmits, to one or more electronic components associated with the vehicle, the one or more data units associated with one of the successfully decoded messages having a longest message length.

In Example 34, the subject matter of Example 33, wherein the concurrently-displayed 2D binary-encoded patterns include a first 2D binary-encoded pattern that is encoded in accordance with a blue wavelength band, a second 2D binary-encoded pattern that is encoded in accordance with a red wavelength band, and a third 2D binary-encoded pattern is encoded in accordance with a green wavelength band.

In Example 35, the subject matter of any combination of Examples 33-34, wherein each one of the concurrently-displayed 2D patterns has a different resolution.

In Example 36, the subject matter of any combination of Examples 33-35, wherein the first 2D binary-encoded pattern has a higher resolution than the second 2D binary-encoded pattern, which has a higher resolution than the third 2D binary-encoded pattern.

In Example 37, the subject matter of any combination of Examples 33-36, wherein the first 2D binary-encoded pattern represents a first encoded message having a message length that is longer than that of a second encoded message represented by the second 2D binary-encoded pattern, which has a message length that is longer than that of a third encoded message represented by the third 2D binary-encoded pattern.

In Example 38, the subject matter of any combination of Examples 33-37, wherein the one or more of the one or more data units are safety driving model parameters that include one or more of an estimated friction coefficient μ, a combined braking efficiency and friction uncertainty factor α, and a velocity v of the other vehicle.

In Example 39, the subject matter of any combination of Examples 33-38, wherein each encoded message associated with each respective one of the set of the concurrently-displayed 2D binary-encoded patterns has a different data frame structure.

Example 40 is a non-transitory computer-readable media associated with a self-adaptive multiresolution digital plate (SAMDP) encoder means having instructions stored thereon that, when executed by one or more processor means, cause the SAMDP encoder means to execute an adaptive communication protocol by: receiving vehicle data regarding an operational state of the vehicle via one or more electronic components associated with the vehicle; calculating one or more data units using the vehicle data; and encoding the one or more data units as part of a set of messages represented by respective 2D binary-encoded patterns, with each one of the set of 2D binary-encoded patterns representing a separately encoded message including at least one of the one or more data units, wherein each one of the set of 2D binary-encoded patterns is encoded in accordance with a different visible wavelength to form a single composite multispectral 2D binary-encoded pattern when the set of 2D binary-encoded patterns is concurrently displayed.

In Example 41, the subject matter of Example 40, further including instructions stored thereon that, when executed by one or more processor means, cause the SAMDP encoder means to execute an adaptive communication protocol by: classifying a current environmental condition based upon sensor data, the classified environmental condition representing a numeric value, wherein the act of encoding the one or more data units as part of a set of messages represented by respective 2D binary-encoded patterns includes encoding each of the one or more data units as a separate one of the set of messages based upon the numeric value representing the classified current environmental condition.

In Example 42, the subject matter of any combination of Examples 40-41, wherein the instructions to encode the one or more data units as part of a set of messages represented by respective 2D binary-encoded patterns includes instructions that, when executed by one or more processor means, cause the SAMDP encoder to encode each encoded message based upon a different predetermined distance between the vehicle and surrounding agents attempting to read the single composite multispectral 2D binary-encoded pattern.

In Example 43, the subject matter of any combination of Examples 40-42, wherein the instructions to encode the one or more data units as part of a set of messages represented by respective 2D binary-encoded patterns includes instructions that, when executed by one or more processor means, cause the SAMDP encoder to encode the one or more parameters as part of a set of messages represented by respective 2D binary-encoded patterns by encoding each separate encoded message to have a different message size based upon a combination of the numeric value representing the classified current environmental condition and the different predetermined distances.

In Example 44, the subject matter of any combination of Examples 40-43, wherein the one or more data units are safety driving model parameters that include one or more of an estimated friction coefficient μ, a combined braking efficiency and friction uncertainty factor α, and a velocity v of the vehicle.

Example 45 is a control system configured to provide assisted driving features for a vehicle, the control system comprising: a binary two-dimensional (2D) code reader means for detecting a composite multispectral 2D binary-encoded pattern that includes a set of concurrently-displayed 2D binary-encoded patterns, each of the set of concurrently-displayed 2D patterns being encoded in accordance with a different visible wavelength; and a binary 2D code decoder means for attempting to decode an encoded message associated with each respective one of the set of the concurrently-displayed 2D binary-encoded patterns to obtain respective sets of one or more data units for each successfully decoded message, wherein the one or more data units are based upon vehicle data regarding an operational state of another vehicle, and wherein the binary 2D code decoder means transmits, to one or more electronic components associated with the vehicle, the one or more data units associated with one of the successfully decoded messages having a longest message length.

In Example 46, the subject matter of Example 45, wherein the concurrently-displayed 2D binary-encoded patterns include a first 2D binary-encoded pattern that is encoded in accordance with a blue wavelength band, a second 2D binary-encoded pattern that is encoded in accordance with a red wavelength band, and a third 2D binary-encoded pattern is encoded in accordance with a green wavelength band, wherein the first 2D binary-encoded pattern has a higher resolution than the second 2D binary-encoded pattern, which has a higher resolution than the third 2D binary-encoded pattern, and wherein the first 2D binary-encoded pattern represents a first encoded message having a message length that is longer than that of a second encoded message represented by the second 2D binary-encoded pattern, which has a message length that is longer than that of a third encoded message represented by the third 2D binary-encoded pattern.

In Example 47, the subject matter of any combination of Examples 45-46, wherein each one of the concurrently-displayed 2D patterns has a different resolution, and wherein each encoded message associated with each respective one of the set of the concurrently-displayed 2D binary-encoded patterns has a different data frame structure.

In Example 48, the subject matter of any combination of Examples 45-47, wherein the one or more of the one or more data units are safety driving model parameters that include one or more of an estimated friction coefficient μ, a combined braking efficiency and friction uncertainty factor α, and a velocity v of the other vehicle.

An apparatus as shown and described.
A method as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processing circuitry" or "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:
1. A self-adaptive multiresolution digital plate (SAMDP) encoder associated with a vehicle, the SAMDP encoder comprising:
a controller area network (CAN) bus reader configured to receive vehicle data regarding an operational state of the vehicle via a CAN bus; and
a binary two-dimensional (2D) code encoder configured to calculate one or more parameters using the vehicle data and to encode at least one of the one or more parameters as part of a set of messages represented by respective 2D binary-encoded patterns, wherein each one of the set of 2D binary-encoded patterns represents a separately encoded message including one or more of the one or more parameters, and wherein the binary 2D code encoder is further configured to encode each one of the set of 2D binary-encoded patterns in accordance with a different visible wavelength such to form a single composite multispectral 2D binary-encoded pattern when the set of 2D binary-encoded patterns is concurrently displayed.

2. The SAMDP encoder of claim 1, wherein the binary 2D code encoder is further configured to classify a current environmental condition based upon sensor data, and wherein the binary 2D code encoder is further configured to encode the set of messages based upon the classified current environmental condition.

3. The SAMDP encoder of claim 2, wherein the binary 2D code encoder is further configured to encode each separately encoded message based upon a different predetermined distance between the vehicle and surrounding agents attempting to read the single composite multispectral 2D binary-encoded pattern.

4. The SAMDP encoder of claim 3, wherein the binary 2D code encoder is further configured to encode each separate encoded message to have a different message size based upon a combination of the classified current environmental condition and the different predetermined distances to the surrounding agents.

5. The SAMDP encoder of claim 1, wherein each one of the set of 2D binary-encoded patterns is associated with a different resolution.

6. The SAMDP encoder of claim 1, wherein the one or more of the one or more parameters are safety driving model parameters that include one or more of an estimated friction coefficient $\mu$, a combined braking efficiency and friction uncertainty factor $\alpha$, and a velocity $v$ of the vehicle.

7. The SAMDP encoder of claim 1, wherein the binary 2D code encoder is further configured to encode each separate encoded message according to a different data frame structure.

8. The SAMDP encoder of claim 1, wherein the binary 2D code encoder is further configured to classify a current environmental condition based upon sensor data and to encode each separate encoded message based upon the classified current environmental condition, wherein a size of messages encoded for better classified environmental conditions are larger than messages encoded for worse classified environmental conditions.

9. A non-transitory computer-readable media associated with a self-adaptive multiresolution digital plate (SAMDP) encoder having instructions stored thereon that, when executed by one or more processors, cause the SAMDP encoder to execute an adaptive communication protocol by:

receiving vehicle data regarding an operational state of the vehicle via one or more electronic components associated with the vehicle;

calculating one or more data units using the vehicle data; and encoding the one or more data units as part of a set of messages represented by respective 2D binary-encoded patterns, with each one of the set of 2D binary-encoded patterns representing a separately encoded message including at least one of the one or more data units, wherein each one of the set of 2D binary-encoded patterns is encoded in accordance with a different visible wavelength to form a single composite multispectral 2D binary-encoded pattern when the set of 2D binary-encoded patterns is concurrently displayed.

10. The non-transitory computer-readable media of claim 9, further including instructions stored thereon that, when executed by one or more processors, cause the SAMDP encoder to execute an adaptive communication protocol by:

classifying a current environmental condition based upon sensor data, the classified environmental condition representing a numeric value, wherein the act of encoding the one or more data units as part of a set of messages represented by respective 2D binary-encoded patterns includes encoding each of the one or more data units as a separate one of the set of messages based upon the numeric value representing the classified current environmental condition.

11. The non-transitory computer-readable media of claim 10, wherein the instructions to encode the one or more data units as part of a set of messages represented by respective 2D binary-encoded patterns includes instructions that, when executed by one or more processors, cause the SAMDP encoder to encode each encoded message based upon a different predetermined distance between the vehicle and surrounding agents attempting to read the single composite multispectral 2D binary-encoded pattern.

12. The non-transitory computer-readable media of claim 11, wherein the instructions to encode the one or more data units as part of a set of messages represented by respective 2D binary-encoded patterns includes instructions that, when executed by one or more processors, cause the SAMDP encoder to encode the one or more parameters as part of a set of messages represented by respective 2D binary-encoded patterns by encoding each separate encoded message to have a different message size based upon a combination of the numeric value representing the classified current environmental condition and the different predetermined distances.

13. The non-transitory computer-readable media of claim 9, wherein the one or more data units are safety driving model parameters that include one or more of an estimated friction coefficient $\mu$, a combined braking efficiency and friction uncertainty factor $\alpha$, and a velocity $v$ of the vehicle.

* * * * *